US012117301B2

(12) United States Patent
Choi et al.

(10) Patent No.: US 12,117,301 B2
(45) Date of Patent: Oct. 15, 2024

(54) APPARATUS AND METHOD FOR CONTROLLING VEHICLE

(71) Applicants: Hyundai Motor Company, Seoul (KR); Kia Corporation, Seoul (KR)

(72) Inventors: Sung Woo Choi, Seoul (KR); Su Jin Han, Seoul (KR); Su Young Choi, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 239 days.

(21) Appl. No.: 17/984,073

(22) Filed: Nov. 9, 2022

(65) Prior Publication Data

US 2023/0304807 A1 Sep. 28, 2023

(30) Foreign Application Priority Data

Mar. 24, 2022 (KR) .................. 10-2022-0036899

(51) Int. Cl.
  *G01C 21/00* (2006.01)
  *G01C 21/34* (2006.01)
(52) U.S. Cl.
  CPC .............. *G01C 21/3461* (2013.01)
(58) Field of Classification Search
  None
  See application file for complete search history.

(56) References Cited

U.S. PATENT DOCUMENTS

| 8,195,363 | B2* | 6/2012 | Isaji | B62D 15/025 |
| | | | | 701/41 |
| 8,610,595 | B1* | 12/2013 | Aleteeby | G08G 1/096741 |
| | | | | 342/107 |
| 10,723,352 | B2* | 7/2020 | Schein | G01C 21/3461 |
| 11,235,800 | B2* | 2/2022 | Jeon | G05D 1/0212 |
| 11,891,047 | B2* | 2/2024 | Laine | B60W 40/114 |
| 12,012,095 | B2* | 6/2024 | Lim | B60W 60/0017 |
| 2005/0206226 | A1* | 9/2005 | Lu | B60T 13/66 |
| | | | | 303/20 |
| 2010/0209886 | A1* | 8/2010 | Lin | G09B 19/167 |
| | | | | 434/66 |
| 2015/0198953 | A1* | 7/2015 | Peake | B62D 15/025 |
| | | | | 701/23 |

(Continued)

FOREIGN PATENT DOCUMENTS

| JP | 2006-190237 A | 7/2006 |
| JP | 2009-157490 A | 7/2009 |

*Primary Examiner* — Jonathan M Dager
(74) *Attorney, Agent, or Firm* — Banner & Witcoff, Ltd.

(57) ABSTRACT

Disclosed are an apparatus and method for controlling a vehicle. The apparatus may include a sensor that detects a boundary of a road, storage that stores a road map, and a controller. The controller may determine start and end points of a first U-turn path based on a U-turn lane link in the road map, determine an arc path based on the start and end points, determine a second U-turn path centered on a front bumper based on the arc path, determine an offset based on a center point of the turning path and a center point of the road boundary, and determine a third U-turn path by applying the offset to the second U-turn path. Accordingly, stability of autonomous driving may be improved by accurately determining a road boundary in a U-turn area and generating a U-turn driving path in consideration of the turning radius of the vehicle.

20 Claims, 12 Drawing Sheets

(56) References Cited

U.S. PATENT DOCUMENTS

| | | | |
|---|---|---|---|
| 2016/0052546 A1 | 2/2016 | Arakane et al. | |
| 2016/0178381 A1* | 6/2016 | Lynch | G01C 21/3848 |
| | | | 701/41 |
| 2017/0247032 A1* | 8/2017 | Lee | B60W 30/12 |
| 2017/0336218 A1* | 11/2017 | Beaurepaire | G08G 1/166 |
| 2018/0362035 A1* | 12/2018 | Schein | G01C 21/3453 |
| 2018/0370532 A1* | 12/2018 | Schein | B60W 50/14 |
| 2019/0009778 A1* | 1/2019 | Schein | B60W 40/04 |
| 2019/0033871 A1* | 1/2019 | Lee | G06V 10/44 |
| 2019/0033874 A1 | 1/2019 | Berkemeier | |
| 2019/0049258 A1* | 2/2019 | Schein | G08G 1/09626 |
| 2020/0066143 A1* | 2/2020 | Yao | G08G 1/08 |
| 2020/0353863 A1* | 11/2020 | Weksler | B60W 50/14 |
| 2021/0004011 A1* | 1/2021 | Oh | G05D 1/0088 |
| 2021/0004016 A1* | 1/2021 | Oh | G05D 1/0221 |
| 2021/0041255 A1* | 2/2021 | Schein | G01C 21/3461 |
| 2021/0096573 A1* | 4/2021 | Yu | G05D 1/0219 |
| 2021/0123750 A1* | 4/2021 | Im | G01C 21/3676 |
| 2021/0221355 A1* | 7/2021 | Kang | B62D 15/025 |
| 2022/0089180 A1* | 3/2022 | Kim | B60W 60/001 |
| 2022/0326714 A1* | 10/2022 | Goyal | B60W 60/0027 |
| 2022/0410883 A1* | 12/2022 | Oh | B60W 50/0097 |
| 2023/0266141 A1* | 8/2023 | Liu | G06T 11/203 |
| 2023/0339468 A1* | 10/2023 | Choi | B60W 60/0015 |
| 2023/0347930 A1* | 11/2023 | Choi | B60W 30/18009 |

* cited by examiner

APPARATUS AND METHOD FOR CONTROLLING VEHICLE

CROSS-REFERENCE TO RELATED APPLICATION

This application claims the benefit of priority to Korean Patent Application No. 10-2022-0036899, filed in the Korean Intellectual Property Office on Mar. 24, 2022, the entire contents of which are incorporated herein by reference.

TECHNICAL FIELD

The present disclosure relates to an apparatus and method for controlling a vehicle.

BACKGROUND

An autonomous vehicle generates a driving route based on surrounding information, and autonomously drives by following the driving route. Accordingly, in particular, in a U-turn area (e.g., a median opening) where the road boundary is on both sides of a vehicle, a driving route must be generated to prevent the vehicle from colliding with the road boundary. Therefore, there is a need to provide a technology for accurately defining the boundary of a road in a U-turn area and generating a driving route.

SUMMARY

The present disclosure has been made to solve the above-mentioned problems occurring in the prior art while advantages achieved by the prior art are maintained intact.

An aspect of the present disclosure provides an apparatus and method for controlling a vehicle that can accurately determine a road boundary in a U-turn area and generate a U-turn driving path in consideration of the turning radius of the vehicle.

The technical problems to be solved by the present disclosure are not limited to the aforementioned problems, and any other technical problems not mentioned herein will be clearly understood from the following description by those skilled in the art to which the present disclosure pertains.

An apparatus for controlling a vehicle may include a sensor configured to detect a boundary of a road; storage configured to store a road map; and a controller. The controller may be configured to determine a start point and an end point of a first U-turn path based on a U-turn lane link in the road map; determine an arc path based on the start point and the end point; determine, based on the arc path, a second U-turn path centered on a front bumper of the vehicle; determine an offset based on a center point of the turning path and a center point of the boundary of the road; and determine a third U-turn path by applying the offset to the second U-turn path.

The controller may be configured to determine the start point and the end point of the first U-turn path by: determining a start point of the U-turn lane link as the start point of the first U-turn path; determining, as an entry lane, a nearest lane among one or more lanes located at least a specified distance away from the start point of the first U-turn path in a perpendicular direction with respect to a longitudinal direction of the vehicle; and determining, as the end point of the first U-turn path, a point which is an intersection between a center line of the entry lane and a perpendicular line extended from the start point of the first U-turn path.

The controller may be further configured to: set the start point as an origin of an x-axis and a y-axis; set the y-axis to pass through the end point; and determine a point, at half a distance between the start point and the end point, as the center point of the arc path.

The controller may be configured to determine the second U-turn path by: determining a heading angle at each point on the arc path; determining, based on the heading angle, a center point of the front bumper; and determining the second U-turn path further based on the center point of the front bumper.

The controller may be further configured to set a point, having a maximum x-axis coordinate value among coordinates on a first side boundary of the road, as a first boundary point.

The controller may be configured to set, among coordinates on a second side boundary of the road that is spaced apart from the first side boundary in an x-axis direction, a point, having a y-axis coordinate value that is equal to a y-axis coordinate value of the first boundary point, as a second boundary point.

The controller may be further configured to set a point, at half a distance between the first boundary point and the second boundary point, as the center point of the boundary of the road.

The controller may be further configured to set, among points at which intermediate values of an outermost turning radius of the vehicle and an innermost turning radius of the vehicle are located, a point, having a y-axis coordinate value that is equal to a y-axis coordinate value of the first boundary point, as the center point of the turning path.

The controller may be configured to determine the offset by: determining a distance between the center point of the turning path and the center point of the boundary of the road; and determining the distance as the offset.

The controller may be configured to determine the third U-turn path by moving the second U-turn path by the offset in a longitudinal direction of the vehicle.

A method may include: determining, via one or more processors, a start point and an end point of a first U-turn path of a vehicle, based on a U-turn lane link stored in a road map; determining an arc path based on the start point and the end point; determining, based on the arc path, a second U-turn path centered on a front bumper of the vehicle; determining an offset based on a center point of the turning path and a center point of a boundary of a road; and determining a third U-turn path by applying the offset to the second U-turn path.

Determining the start point and the end point of the first U-turn path may include: determining a start point of the U-turn lane link as the start point of the first U-turn path; determining, as an entry lane, a nearest lane among one or more lanes located at least a specified distance away from the start point of the first U-turn path in a perpendicular direction with respect to a longitudinal direction of the vehicle; and determining, as the end point of the first U-turn path, a point which is an intersection between a center line of the entry lane and a perpendicular line extended from the start point of the first U-turn path.

The method may further include: setting the start point as an origin of an x-axis and a y-axis; setting the y-axis to pass through the end point; and determining a point, at half a distance between the start point and the end point, as the center point of the arc path.

Determining the second U-turn path may include: determining a heading angle at each point on the arc path; determining, based on the heading angle, a center point of the front bumper; and determining the second U-turn path further based on the center point of the front bumper.

The method may further include setting a point, having a maximum x-axis coordinate value among coordinates on a first side boundary of the road, as a first boundary point.

The method may further include setting, among coordinates on a second side boundary of the road that is spaced apart from the first side boundary in an x-axis direction, a point, having a y-axis coordinate value that is equal to a y-axis coordinate value of the first boundary point, as a second boundary point.

The method may further include setting a point, at half a distance between the first boundary point and the second boundary point, as the center point of the boundary of the road.

The method may further include setting, among points at which intermediate values of an outermost turning radius of the vehicle and an innermost turning radius of the vehicle are located, a point, having a y-axis coordinate value that is equal to a y-axis coordinate value of the first boundary point, as the center point of the turning path.

Determining the offset may include: determining a distance between the center point of the turning path and the center point of the boundary of the road; and determining the distance as the offset.

Determining the third U-turn path may include moving the second U-turn path by the offset in a longitudinal direction of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
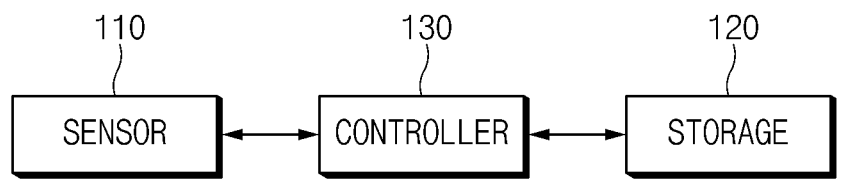
FIG. 1 is a block diagram illustrating the configuration of an example apparatus for controlling a vehicle.

Hereinafter, some embodiments of the present disclosure will be described in detail with reference to the exemplary drawings. Regarding the reference numerals to the components of each drawing, it should be noted that the identical or equivalent component is designated by the identical numeral even when they are displayed on other drawings. Further, in describing one or more embodiments of the present disclosure, a detailed description of the related known configuration or function will be omitted when it is determined that it interferes with the understanding of the one or more embodiments of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of an example apparatus for controlling a vehicle.

As shown in FIG. 1, an apparatus 100 for controlling a vehicle may include a sensor 110, storage 120, and a controller 130.

The sensor 110 may obtain surrounding information of a vehicle. The sensor 110 may be implemented as a lidar, a radar, an ultrasonic sensor, or an image sensor capable of detecting a boundary of a road.

The storage 120 may store a map (e.g., a high-definition map). The map may be a road map that includes an area where the vehicle is located. The map may include lane link information corresponding to various road shapes, and may include a U-turn lane link. A lane link may be a section of a route or path that connects two or more lanes to guide vehicles. Lane links may indicate, for example, various left-turn paths at intersections that vehicles may follow to leave one lane and merge to another lane. A U-turn lane link may indicate a path a vehicle may take to traverse from one lane to merge to an adjacent and/or opposing lane. A U-turn lane link may be located at, for example, an opening in a median (e.g., a median opening) that allows vehicles to make a left turn or a U-Turn across the median. The storage 120 may store at least one algorithm for performing operations or executions of various commands for the operation of an apparatus for controlling a vehicle. The storage 120 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 130 may be implemented with various processing devices such as a microprocessor and the like in which a semiconductor chip, capable of performing operations or executions of various commands, is built in, and may control operations of an apparatus for controlling a vehicle.

The controller 130 may determine a start point and an end point of a U-turn path based on the U-turn lane link in the map. For a more detailed description, refer to FIG. 2.

Figure 2:
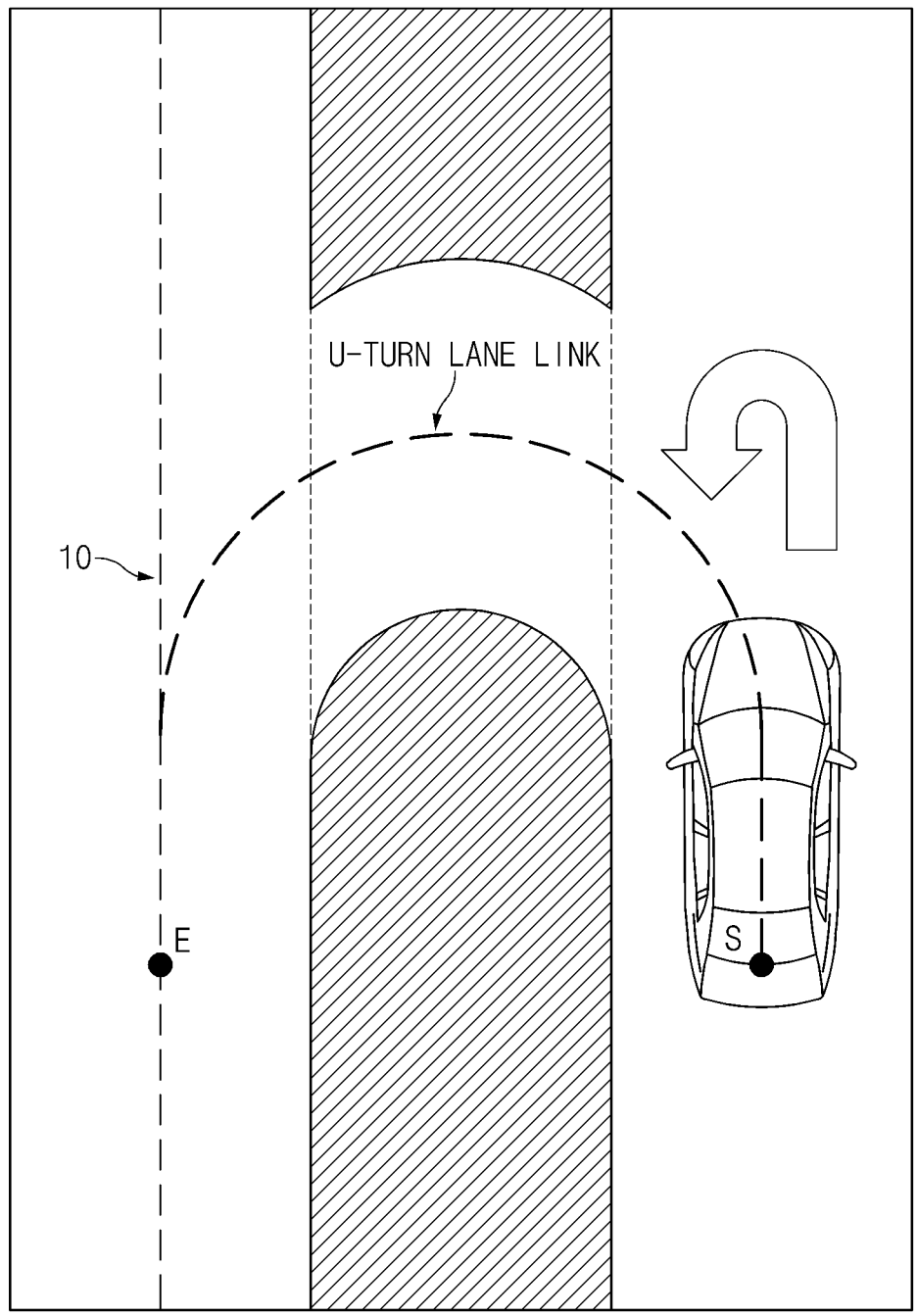
FIG. 2 is a diagram illustrating the start point and the end point of an example U-turn path.

FIG. 2 is a diagram illustrating the start point and the end point of an example U-turn path.

As shown in FIG. 2, the controller 130 may determine a start point of a U-turn lane link as a start point S of a U-turn path. The controller 130 may determine the closest lane, among the lanes located at a place spaced apart from the start point S by at least a specified distance (e.g., minimum distance) or more away in a direction perpendicular to the longitudinal axis (e.g., driving direction) of the vehicle, as an entry lane (e.g., a lane to merge to after the U-turn). The specified (e.g., minimum) distance may be calculated as twice the minimum turning radius with respect to the center of the rear wheel shaft of a vehicle.

The controller 130 may determine a point, which is at an intersection between a center line 10 of the entry lane and a perpendicular foot extended from the start point S to the center line 10 (e.g., a line extended from the start point S perpendicular to the center line 10), as an end point E of the U-turn path.

The controller 130 may generate an arc path based on the start point S and the end point E. For a more detailed description, refer to FIGS. 3 to 6.

Figure 3:
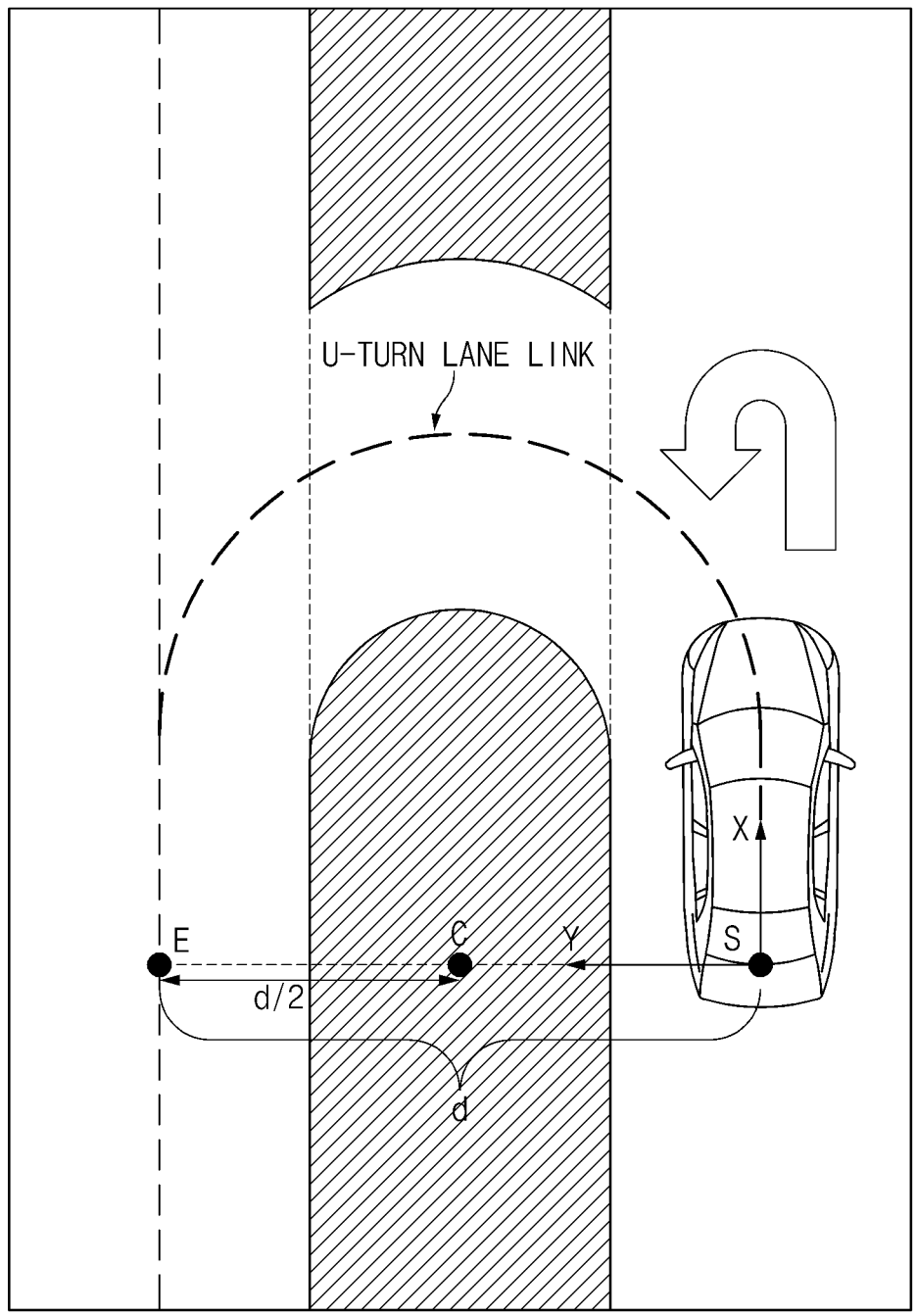
FIG. 3 is a diagram illustrating the center point of an example arc path.
Figure 4:
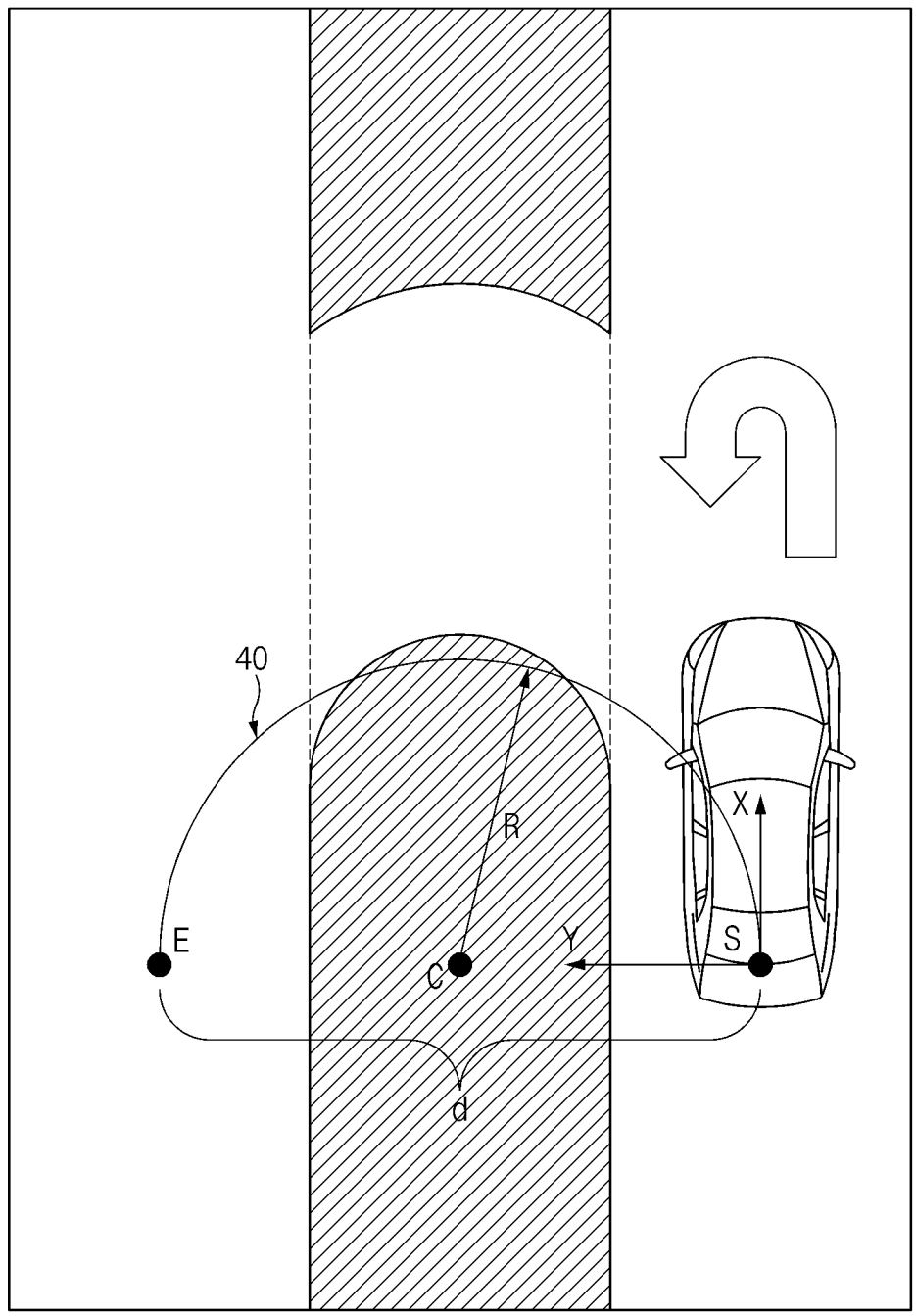
FIG. 4 is a diagram illustrating generation of an example arc path.
Figure 5:
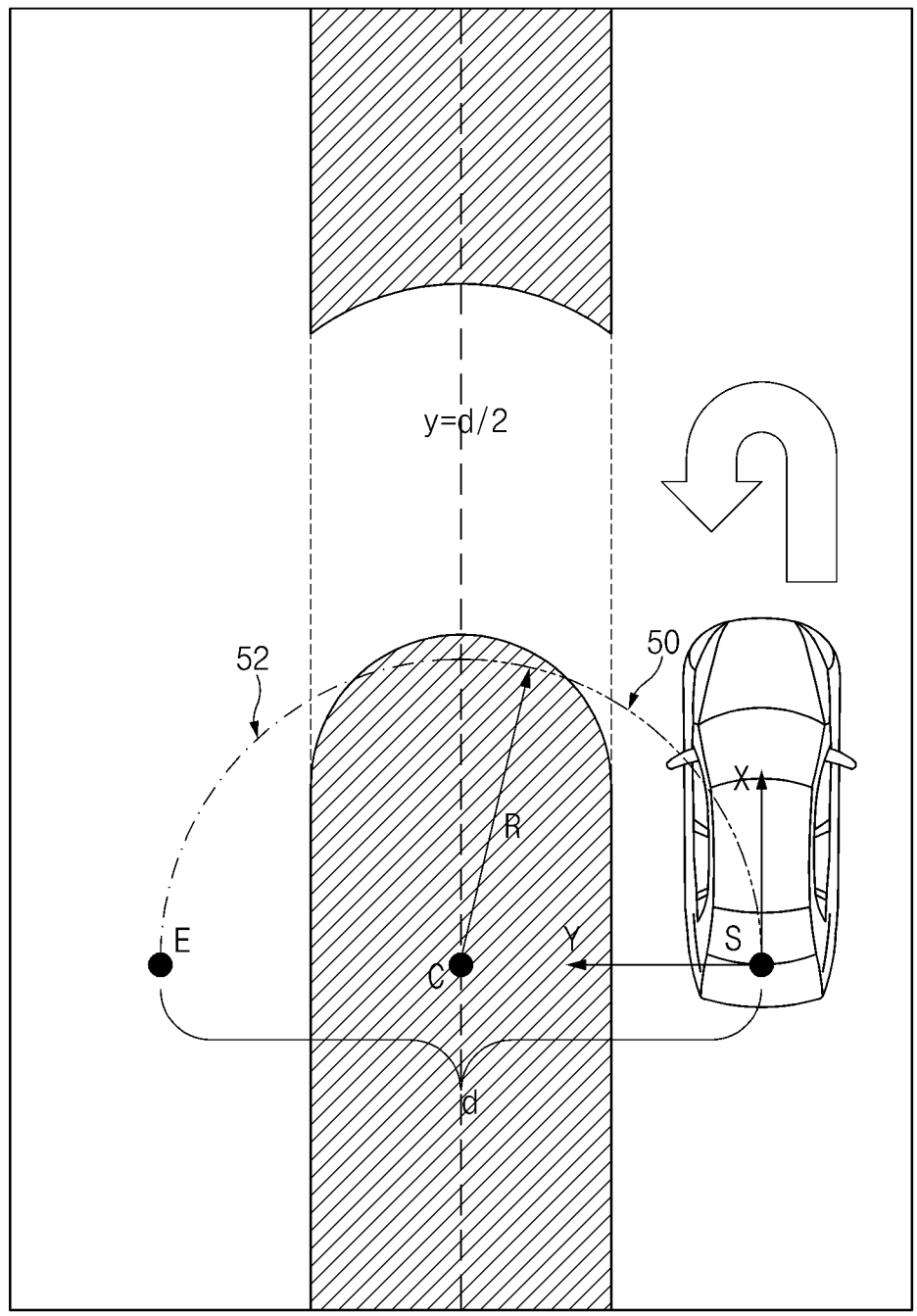
FIG. 5 is a diagram illustrating generation of an example arc path.

FIG. 3 is a diagram illustrating the center point of an example arc path. FIGS. 4 and 5 are diagrams each illustrating generation of an example arc path.

As shown in FIG. 3, the controller 130 may assume that the center of the rear wheel shaft of a vehicle is located at the U-turn start point, set (e.g., determine, define, etc.) an x-axis and y-axis, set the origin of the x-axis and y-axis as the start point S, and set the y-axis to pass through the end point E. The controller 130 may set a point at half the distance between the start point S and the end point E as a center point C of the arc path. Therefore, when it is assumed that the distance between the start point S and the end point E is d, the distance between the start point S and the center point C is d/2, and the distance between the end point E and the center point C is d/2.

As shown in FIG. 4, the controller 130 may assume that the center of the rear wheel shaft of the vehicle is located at the U-turn start point S, and generate an arc path 40 from the U-turn start point S based on the center point C of the arc path. The controller 130 may set the radius R of the arc path 40 to be d/2.

When generating the arc path, the controller 130 may set the arc path as 0≤y≤d to generate the arc path 40 using Equation 1, and may set coordinates [x,y]=($x_{circle}$, $y_{circle}$) of each point on the arc path 40.

$$x = \sqrt{R^2 - \left(y - \frac{d}{2}\right)^2}$$ ⟨Equation 1⟩

As shown in FIG. 5, when generating an arc path, the controller 130 may set the arc path as 0≤y≤d/2, generate an arc path 50 using Equation 1, and set coordinates [x,y]=($x_{circle}$, $y_{circle}$) of each point on the arc path 50. In addition, the controller 130 may generate an arc path 52, which is obtained by reflecting the arc path 50 across the axis of symmetry of y=d/2, and may set coordinates [x,y]=($x_{symmetric}$, $y_{symmetric}$) of each point on the arc path 52.

The controller 130 may represent the entire arc path as [x, y]=($x_{circle}$, $y_{circle}$)+($x_{symmetric}$, $y_{symmetric}$).

After the arc path is generated, the controller 130 may calculate a heading angle (e.g., an angle at which the vehicle is oriented relative to the x-axis) at each point on the arc path. For a more detailed description, refer to FIG. 6.

Figure 6:
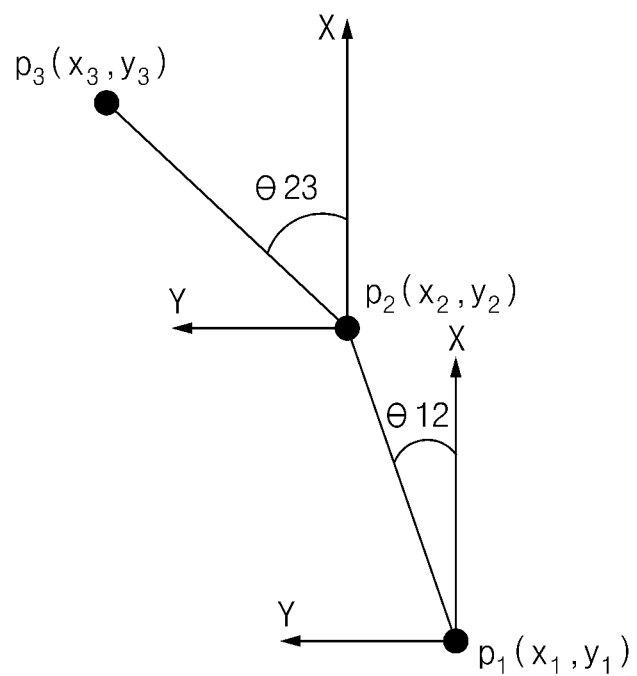
FIG. 6 is a diagram illustrating the heading angle of each point on an example arc path.

FIG. 6 is a diagram illustrating the heading angle of each point on an example arc path.

As shown in FIG. 6, the controller 130 may calculate a heading angle $\theta_{12}$ between a first point $p_1$ ($x_1$, $y_1$) and a second point $p_2$ ($x_2$, $y_2$) on an arc path by using Equation 2, and calculate a heading angle $\theta_{23}$ between the second point $p_2$ ($x_2$, $y_2$) and a third point $p_3$ ($x_3$, $y_3$) by using Equation 3.

$$\theta_{12} = \tan^{-1}\frac{y_2 - y_1}{x_2 - x_1}$$ ⟨Equation 2⟩

$$\theta_{23} = \tan^{-1}\frac{y_3 - y_2}{x_3 - x_2}$$ ⟨Equation 3⟩

The controller 130 may use the heading angles of each point (the average value $\theta_2$ of heading angle $\theta_{12}$ and heading angle $\theta_{23}$) as the heading angle of the second point.

When the heading angle of each point on the arc path is calculated, the controller 130 may calculate the center coordinates of a front bumper based on the heading angle. For a more detailed description, refer to FIG. 7.

Figure 7:
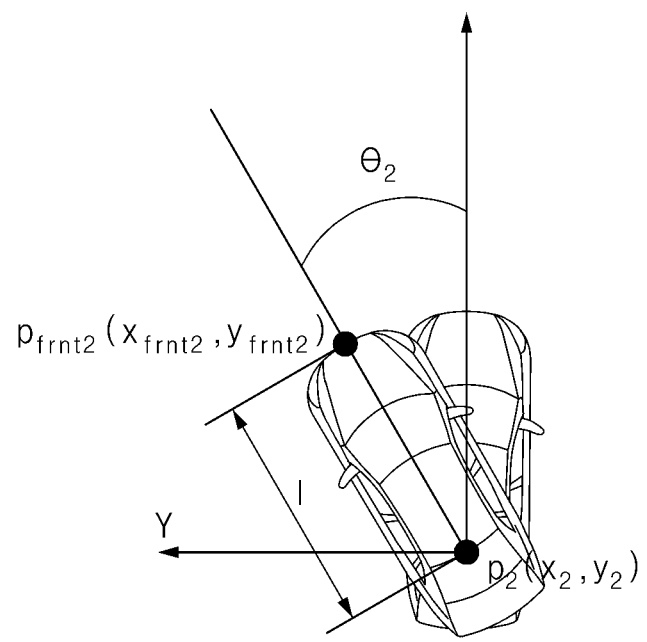
FIG. 7 is a diagram illustrating a change in the center of a front bumper of an example rotating vehicle.

FIG. 7 is a diagram illustrating a change in the center of a front bumper of an example rotating vehicle.

As shown in FIG. 7, when it is assumed that the heading angle at the second point $p_2$ ($x_2$, $y_2$) is $\theta_2$, the controller 130 may calculate the coordinates ($x_{frnt2}$, $y_{frnt2}$) of the center point of the front bumper by using Equation 4 and Equation 5.

$$x_{frnt2} = x_2 + 1 \times \cos \theta_2$$ Equation 4

$$y_{frnt2} = y_2 + 1 \times \sin \theta_2$$ Equation 5

(where 1 is the distance from the rear wheel shaft of a vehicle to the front bumper)

Figure 8:
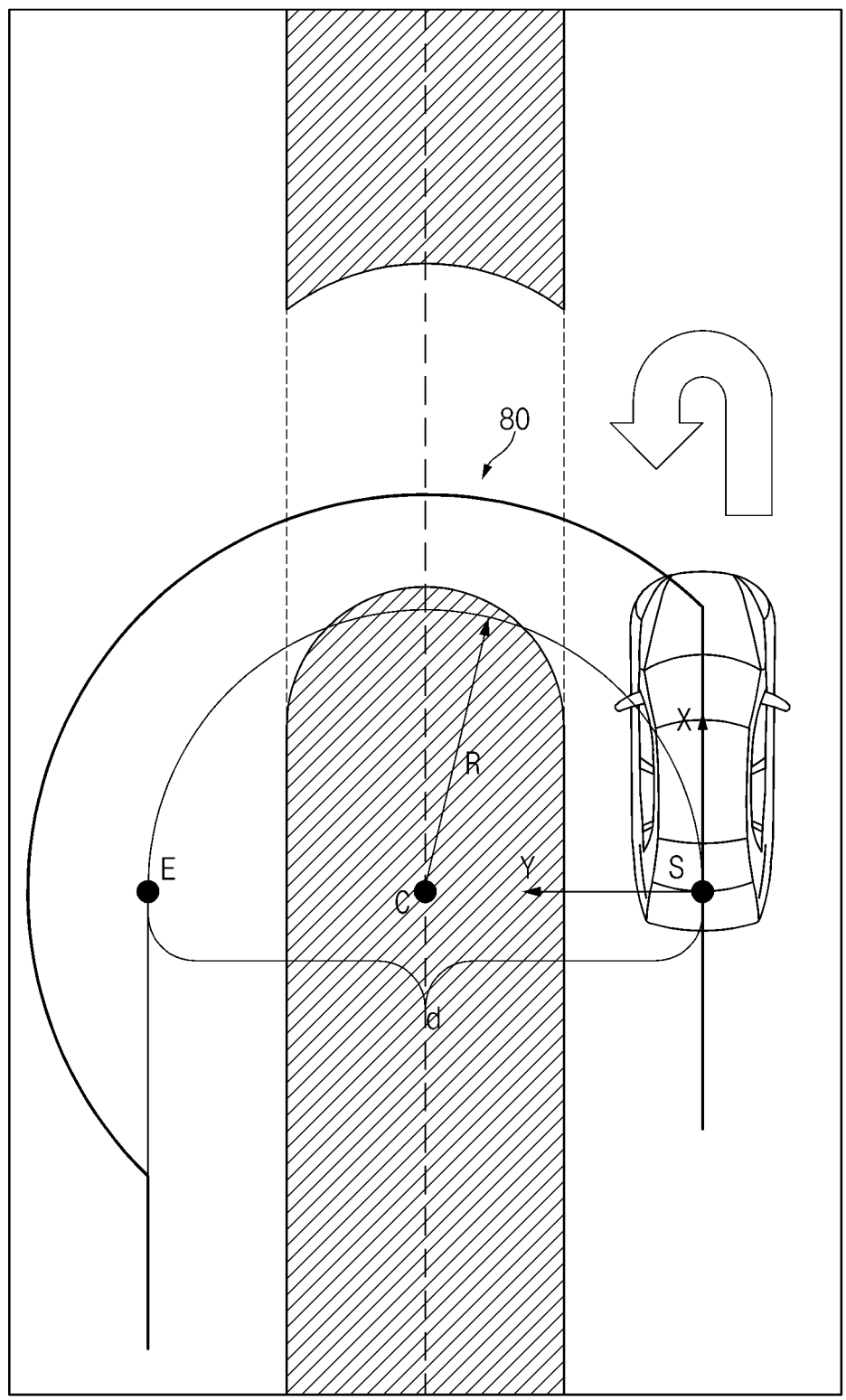
FIG. 8 is a diagram illustrating a U-turn path centered on a front bumper of an example vehicle.

The controller 130 may calculate the coordinates of the center point of the front bumper by using Equations 4 and 5 for each point of the arc path, and as shown in FIG. 8, may generate an U-turn path 80 centered on the front bumper based on the center point of the front bumper.

The controller 130 may set the center point of a road boundary, and calculate an offset by using the center point of the arc path and the center point of the road boundary. For a more detailed description, refer to FIG. 9.

Figure 9:
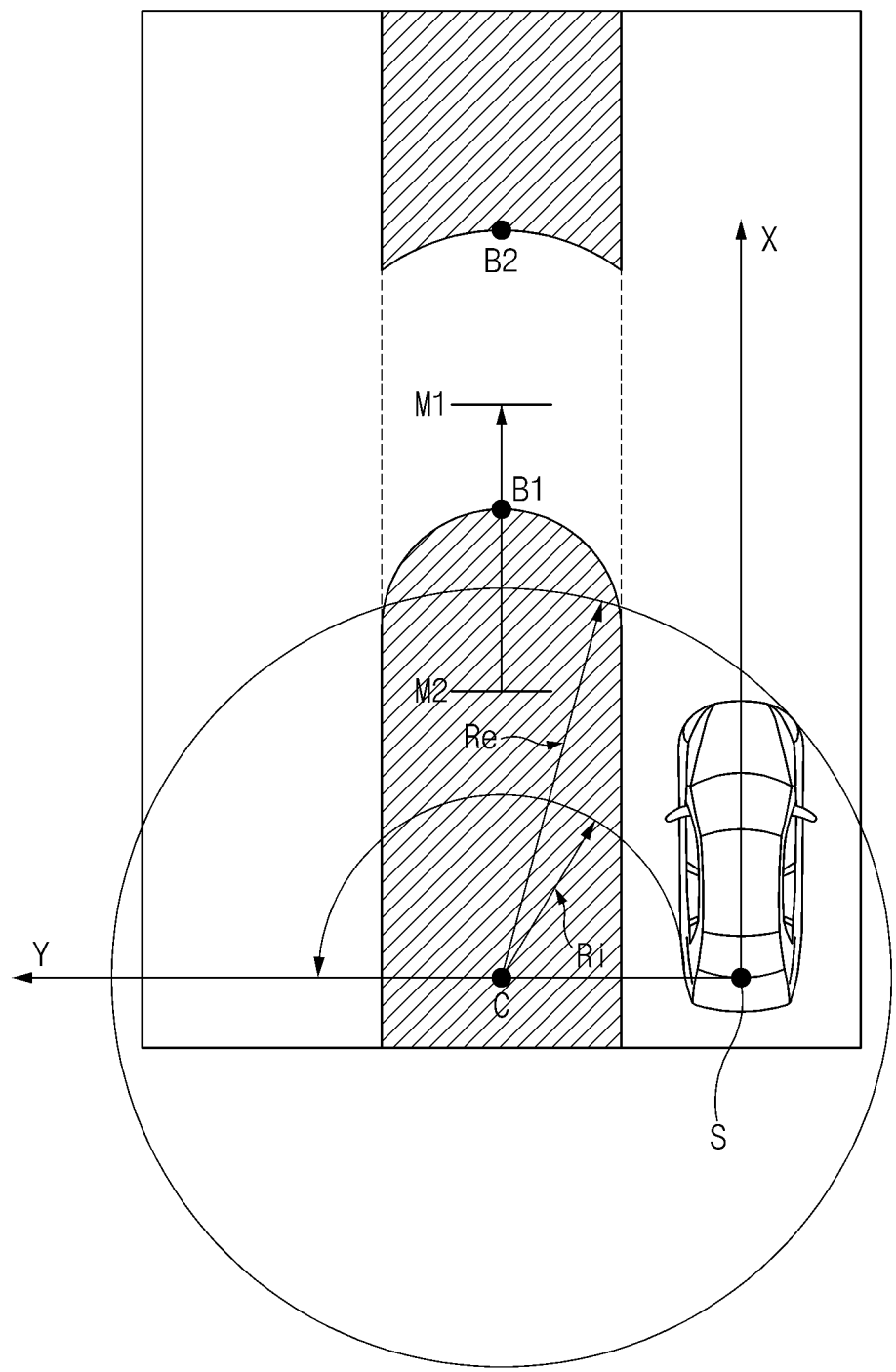
FIG. 9 is a diagram illustrating calculation of an example offset.

FIG. 9 is a diagram illustrating calculation of an example offset.

As shown in FIG. 9, the controller 130 may set coordinates on a road boundary to set the center point of the road boundary. The road boundary may exist on both sides of the road. Hereinafter, for convenience of description, the boundary existing on both sides of a road is divided into a first side boundary and a second side boundary spaced apart from the first side boundary in the x-axis direction. The controller 130 may set, as a first boundary point B1, a point having the largest (e.g., maximum) x-axis coordinate value among the coordinates on the first side boundary (e.g., lower boundary, inner boundary, etc.) of the road. In addition, the controller 130 may set, as a second boundary point B2, a boundary point having the same y-axis coordinate value as the y-axis coordinate value of the first boundary point among the coordinates set on the second side boundary (e.g., upper boundary, outer boundary, etc.) of the road.

The controller 130 may set a point which is located at half the distance between the first boundary point B1 and the second boundary point B2 as a center point M1 of the road boundary.

In order to generate the final U-turn path by applying the offset to the U-turn path centered on the front bumper center, the controller 130 may calculate an outermost turning radius Re of the vehicle and an innermost turning radius Ri of the vehicle assuming that the center of the rear wheel shaft of a vehicle is located at the U-turn start point, and calculate an intermediate value between the outermost turning radius Re and the innermost turning radius Ri of the vehicle by using Equation 6.

Intermediate value=$(Re-Ri)/2$  Equation 6

The controller 130 may set, as a center point of turning path M2, a point having the y-axis coordinate value equal to the y-axis coordinate value of the first boundary point B1 among points at which the intermediate values of the outermost turning radius Re and the innermost turning radius Ri of the vehicle are located.

The controller 130 may calculate the offset by using Equation 7.

Offset=$M1-M2$  Equation 7

The controller 130 may generate a final U-turn path F by applying the offset to the U-turn path centered on the front bumper. For a more detailed description, refer to FIG. 10.

Figure 10:
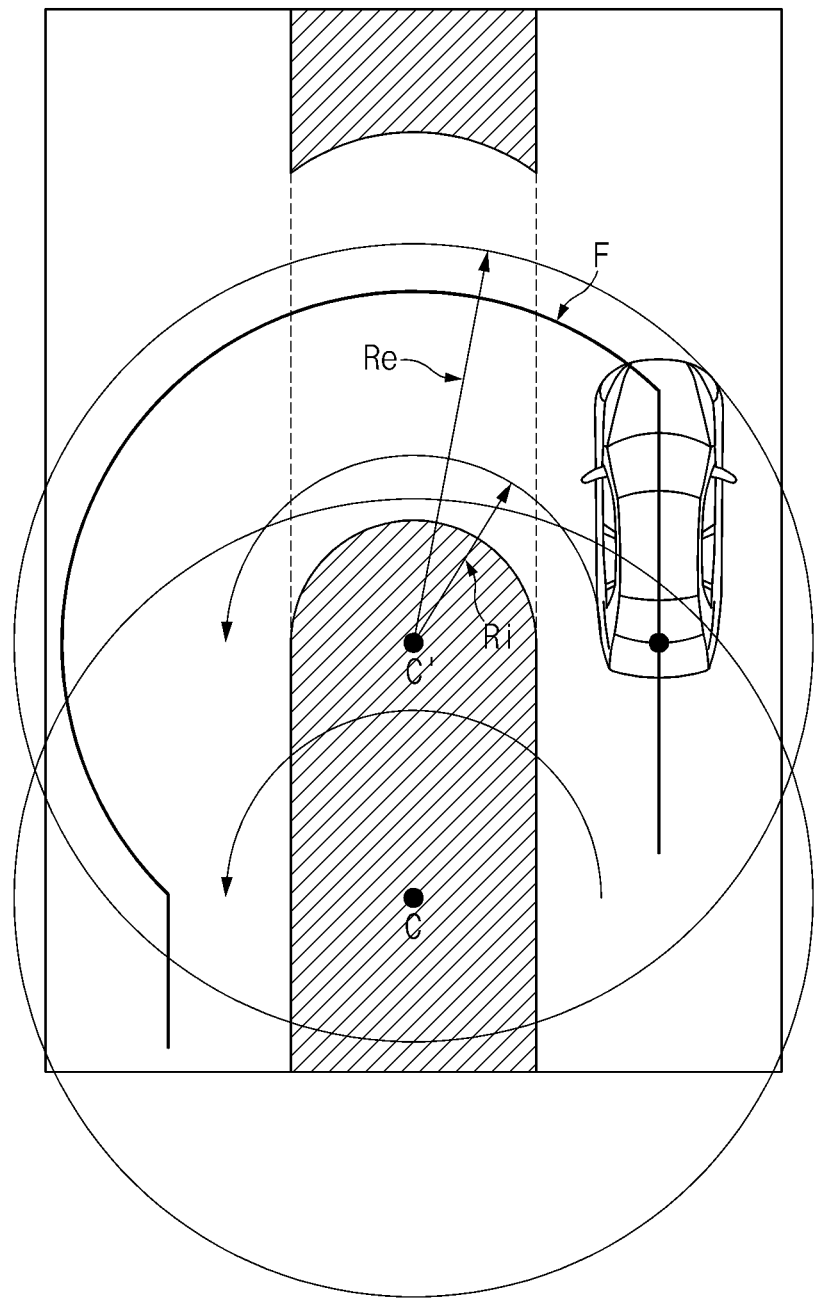
FIG. 10 is a diagram illustrating generation of an example final U-turn path.

FIG. 10 is a diagram illustrating generation of an example final U-turn path.

As shown in FIG. 10, the controller 130 may move the center point of turning path M2 to the center point M1 of the road boundary to move the center point C of the arc path to C'. As the center of the arc path moves, the controller 130 may move the arc path by the offset in the longitudinal direction, and as the arc path moves, the U-turn path centered on the front bumper also may move by the offset in the longitudinal (e.g., x-axis) direction, thereby generating the final U-turn path F.

Figure 11:
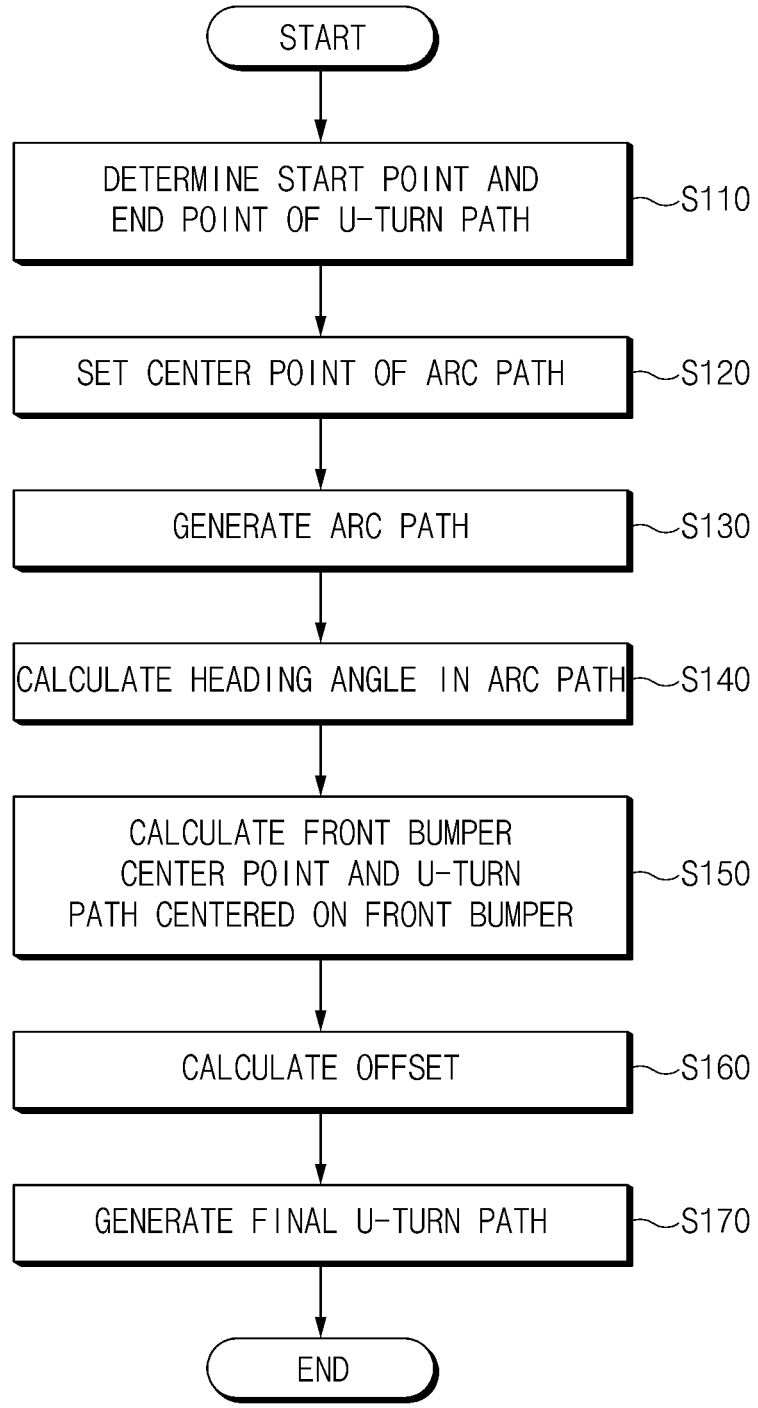
FIG. 11 is a flowchart illustrating an example method of controlling a vehicle.

FIG. 11 is a flowchart illustrating an example method of controlling a vehicle. The example method, or one or more steps of the method, may be performed by one or more computing devices or entities. For example, all or portions of the method may be performed by controller 130 as shown in FIG. 1 but they may be performed by any other device(s) disclosed herein. The method or one or more steps thereof may be embodied in computer-executable instructions that are stored in a computer-readable medium, such as a non-transitory computer readable medium. The steps in this flow chart need not all be performed in the order specified and some steps may be omitted or changed in order. Other step(s) may be added to the method in any order.

As shown in FIG. 11, in S110, the controller 130 may determine a start point and an end point of a U-turn path.

In S110, the controller 130 may determine the start point of a U-turn lane link as the start point S of a U-turn path. The controller 130 may determine the closest lane among the lanes located at a place spaced apart from the start point S by at least a specified (e.g., minimum) distance or more in a perpendicular direction (e.g., with respect to the longitudinal direction of a vehicle) as an entry lane. The specified distance may be calculated as twice the minimum turning radius with respect to the center of the rear wheel shaft of a vehicle. The controller 130 may determine a point, at an intersection between the center line 10 of the entry lane and a perpendicular foot extended from the start point S to the center line 10, as an end point E of the U-turn path.

In S120, assuming that the center of the rear wheel shaft of the vehicle is located at the start point S, the controller 130 may generate an arc path based on the start point S and the end point E, and set the center point of the arc path. In S120, the controller 130 may set an x-axis and y-axis, set the origin of the x-axis and y-axis as the start point S, and set the y-axis to pass through the end point E. The controller 130 may set a point half the distance between the start point S and the end point E as the center point C of the arc path. Therefore, when it is assumed that the distance between the start point S and the end point E is d, the distance between the start point S and the center point C is d/2 and the distance between the end point E and the center point C is d/2.

In S130, the controller 130 may generate (e.g., determine) an arc path based on the center point C of the arc path. In S130, the controller 130 may set the radius R of the arc path 40 to be d/2. When generating the arc path, the controller 130 may set the arc path as 0≤y≤d to generate the arc path 40 using Equation 1, and may set coordinates [x, y]=($x_{circle}$, $y_{circle}$) of each point on the arc path 40.

When generating an arc path, the controller 130 may set the arc path as 0≤y≤d/2, generate the arc path 50 using Equation 1, and set coordinates [x,y]=($x_{circle}$, $y_{circle}$) of each point on the arc path 50. In addition, the controller 130 may generate the arc path 52 which is obtained by reflecting the arc path 50 across the axis of symmetry of y=d/2, and may set coordinates [x,y]=($x_{symmetric}$, $y_{symmetric}$) of each point on the arc path 52.

The controller 130 may represent the entire arc path as [x, y]=($x_{circle}$, $y_{circle}$)+($x_{symmetric}$, $y_{symmetric}$).

In S140, after the arc path is generated, the controller 130 may calculate (e.g., determine) a heading angle at each point on the arc path. As shown in FIG. 6, in S140, the controller 130 may calculate a heading angle $\theta_{12}$ between a first point $p_1$ ($x_1$, $y_1$) and a second point $p_2$ ($x_2$, $y_2$) on an arc path by using Equation 2, and calculate a heading angle $\theta_{23}$ between the second point $p_2$ ($x_2$, $y_2$) and a third point $p_3$ ($x_3$, $y_3$) by using Equation 3.

According to an embodiment, the controller 130 may use the average value $\theta_2$ of the heading angles at respective points (e.g., heading angle $\theta_{12}$ and heading angle $\theta_{23}$) as the heading angle of the second point.

In S150, after the heading angle at each point on the arc path is calculated, the controller 130 may calculate (e.g., determine) the center coordinates of a front bumper based on the heading angle. As shown in FIG. 7, in S150, if it is assumed that the heading angle at the second point $p_2$ ($x_2$, $y_2$) is $\theta_2$, the controller 130 may calculate the coordinates ($x_{frnt2}$, $y_{frnt2}$) of the center point of the front bumper by using Equation 4 and Equation 5.

The controller 130 may calculate the coordinates of the center point of the front bumper by using Equations 4 and 5 for each point of the arc path, and as shown in FIG. 8, may generate the U-turn path 80 centered on the front bumper based on the center point of the front bumper.

In S160, the controller 130 may set the center point of a road boundary, and calculate (e.g., determine) an offset by using the center point of the arc path and the center point of the road boundary.

In S160, the controller 130 may set coordinates on a road boundary to set the center point of the road boundary. The controller 130 may set, as the first boundary point B1, a point having the largest x-axis coordinate value among the coordinates set on the first side boundary (e.g., lower boundary, inner boundary, etc.) of the road. In addition, the controller 130 may set, as the second boundary point B2, the point having the same y-axis coordinate value as the y-axis coordinate value of the first boundary point among the coordinates set on the second side boundary (e.g., upper boundary, outer boundary, etc.) of the road spaced apart from the first side boundary in the x-axis direction.

The controller 130 may set a point which is located at half the distance between the first boundary point B1 and the second boundary point B2 as the center point M1 of the road boundary.

In order to generate the final U-turn path by applying the offset to the U-turn path centered on the front bumper center, the controller 130 may assume that the center of the rear wheel shaft of a vehicle is located at the U-turn start point, calculate the outermost turning radius Re of the vehicle and the innermost turning radius Ri of the vehicle, and calculate an intermediate value between the outermost turning radius Re and the innermost turning radius Ri of the vehicle by using Equation 7.

The controller 130 may set, as the center point of turning path M2, a point having the y-axis coordinate value equal to the y-axis coordinate value of the first boundary point B1 among points at which the intermediate values of the outermost turning radius Re and the innermost turning radius Ri of the vehicle are located.

The controller 130 may calculate the offset by using Equation 8.

In S170, the controller 130 may generate (e.g., determine) the final U-turn path F by applying the offset to the U-turn path centered on the front bumper in the longitudinal direction.

In S170, the controller 130 may move the center point of turning path M2 to the center point M1 of the road boundary to move the center point C of the arc path to C'. As the center of the arc path moves, the controller 130 may move the arc path by the offset in the longitudinal direction, and as the arc path moves, the U-turn path centered on the front bumper also may move by the offset in the longitudinal direction, thereby generating the final U-turn path F. The controller 130 and/or another component of the vehicle may use the final U-turn path F thus generated to control the vehicle to make a U-turn autonomously or semi-autonomously (e.g., provide the U-turn path F as a guideline for a driver).

Figure 12:
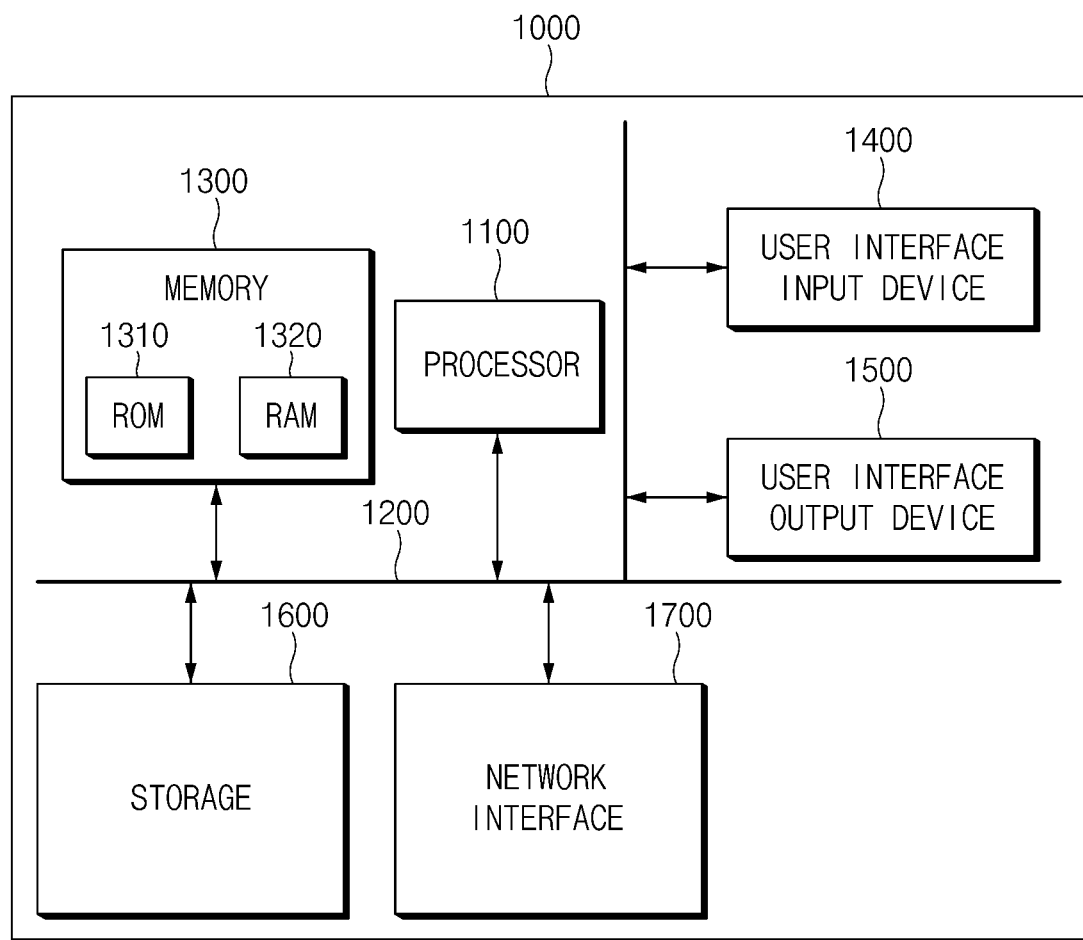
FIG. 12 is a block diagram illustrating an example computing system for executing one or more embodiments of the present disclosure.

FIG. 12 is a block diagram illustrating an example computing system for executing one or more embodiments of the present disclosure.

Referring to FIG. 12, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) and/or any semiconductor device that processes instructions stored in the memory 1300 and/or the storage 1600. The memory 1300 and the storage 1600 may include various types of volatile or non-volatile storage media. For example, the memory 1300 may include a ROM (read-only memory) 1310 and a RAM (random access memory) 1320.

Accordingly, the processes of the method or algorithm described in relation to the embodiments of the present disclosure may be implemented directly by hardware executed by the processor 1100, a software module, or a combination thereof. The software module may reside in a storage medium (e.g., the memory 1300 and/or the storage 1600), such as a RAM, a flash memory, a ROM, an erasable programmable read-only memory (EPROM), an EEPROM, a register, a hard disk, solid-state drive (SSD), a detachable disk, or a compact disc read-only memory (CD-ROM). The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. The processor and the storage medium may reside in the user terminal as an individual component.

The apparatus and method for controlling a vehicle according to the embodiments of the present disclosure may improve autonomous driving stability by accurately determining a road boundary in a U-turn area and generating a U-turn driving path in consideration of the turning radius of the vehicle.

Although example embodiments of the present disclosure have been described for illustrative purposes, those skilled in the art will appreciate that various modifications, additions and substitutions are possible, without departing from the scope and spirit of the disclosure.

Therefore, the example embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling a vehicle, the apparatus comprising:
a sensor configured to detect a boundary of a road;
storage configured to store a road map; and
a controller configured to:
determine a start point and an end point of a first U-turn path based on a U-turn lane link in the road map;
determine an arc path based on the start point and the end point;
determine, based on the arc path, a second U-turn path centered on a front bumper of the vehicle;
determine an offset based on a center point of the turning path and a center point of the boundary of the road; and
determine a third U-turn path by applying the offset to the second U-turn path.

2. The apparatus of claim 1, wherein the controller is configured to determine the start point and the end point of the first U-turn path by:
determining a start point of the U-turn lane link as the start point of the first U-turn path;
determining, as an entry lane, a nearest lane among one or more lanes located at least a specified distance away from the start point of the first U-turn path in a perpendicular direction with respect to a longitudinal direction of the vehicle; and
determining, as the end point of the first U-turn path, a point which is an intersection between a center line of the entry lane and a perpendicular line extended from the start point of the first U-turn path.

3. The apparatus of claim 1, wherein the controller is further configured to:
set the start point as an origin of an x-axis and a y-axis;
set the y-axis to pass through the end point; and
determine a point, at half a distance between the start point and the end point, as the center point of the arc path.

4. The apparatus of claim 1, wherein the controller is configured to determine the second U-turn path by:
determining a heading angle at each point on the arc path;
determining, based on the heading angle, a center point of the front bumper; and
determining the second U-turn path further based on the center point of the front bumper.

5. The apparatus of claim 1, wherein the controller is further configured to set a point, having a maximum x-axis coordinate value among coordinates on a first side boundary of the road, as a first boundary point.

6. The apparatus of claim 5, wherein the controller is configured to set, among coordinates on a second side boundary of the road that is spaced apart from the first side boundary in an x-axis direction, a point, having a y-axis coordinate value that is equal to a y-axis coordinate value of the first boundary point, as a second boundary point.

7. The apparatus of claim 6, wherein the controller is further configured to set a point, at half a distance between the first boundary point and the second boundary point, as the center point of the boundary of the road.

8. The apparatus of claim 5, wherein the controller is further configured to set, among points at which intermediate values of an outermost turning radius of the vehicle and an innermost turning radius of the vehicle are located, a point, having a y-axis coordinate value that is equal to a y-axis coordinate value of the first boundary point, as the center point of the turning path.

9. The apparatus of claim 1, wherein the controller is configured to determine the offset by:
  determining a distance between the center point of the turning path and the center point of the boundary of the road; and
  determining the distance as the offset.

10. The apparatus of claim 1, wherein the controller is configured to determine the third U-turn path by moving the second U-turn path by the offset in a longitudinal direction of the vehicle.

11. A method comprising:
  determining, via one or more processors, a start point and an end point of a first U-turn path of a vehicle, based on a U-turn lane link stored in a road map;
  determining an arc path based on the start point and the end point;
  determining, based on the arc path, a second U-turn path centered on a front bumper of the vehicle;
  determining an offset based on a center point of the turning path and a center point of a boundary of a road; and
  determining a third U-turn path by applying the offset to the second U-turn path.

12. The method of claim 11, wherein the determining the start point and the end point of the first U-turn path comprises:
  determining a start point of the U-turn lane link as the start point of the first U-turn path;
  determining, as an entry lane, a nearest lane among one or more lanes located at least a specified distance away from the start point of the first U-turn path in a perpendicular direction with respect to a longitudinal direction of the vehicle; and
  determining, as the end point of the first U-turn path, a point which is an intersection between a center line of the entry lane and a perpendicular line extended from the start point of the first U-turn path.

13. The method of claim 11, further comprising:
  setting the start point as an origin of an x-axis and a y-axis;
  setting the y-axis to pass through the end point; and
  determining a point, at half a distance between the start point and the end point, as the center point of the arc path.

14. The method of claim 11, wherein the determining the second U-turn path comprises:
  determining a heading angle at each point on the arc path;
  determining, based on the heading angle, a center point of the front bumper; and
  determining the second U-turn path further based on the center point of the front bumper.

15. The method of claim 11, further comprising:
  setting a point, having a maximum x-axis coordinate value among coordinates on a first side boundary of the road, as a first boundary point.

16. The method of claim 15, further comprising:
  setting, among coordinates on a second side boundary of the road that is spaced apart from the first side boundary in an x-axis direction, a point, having a y-axis coordinate value that is equal to a y-axis coordinate value of the first boundary point, as a second boundary point.

17. The method of claim 16, further comprising:
  setting a point, at half a distance between the first boundary point and the second boundary point, as the center point of the boundary of the road.

18. The method of claim 15, further comprising:
  setting, among points at which intermediate values of an outermost turning radius of the vehicle and an innermost turning radius of the vehicle are located, a point, having a y-axis coordinate value that is equal to a y-axis coordinate value of the first boundary point, as the center point of the turning path.

19. The method of claim 11, wherein the determining the offset comprises:
  determining a distance between the center point of the turning path and the center point of the boundary of the road; and
  determining the distance as the offset.

20. The method of claim 11, wherein the determining the third U-turn path comprises:
  moving the second U-turn path by the offset in a longitudinal direction of the vehicle.

* * * * *